United States Patent [19]

Tesch

[11] Patent Number: 4,867,368
[45] Date of Patent: Sep. 19, 1989

[54] APPARATUS FOR CENTERING AND CLAMPING PIPE WORKPIECES TO BE WELDED TO ONE ANOTHER

[76] Inventor: Klaus Tesch, Dorotheenstrasse 93, 200 Hamburg 60, Fed. Rep. of Germany

[21] Appl. No.: 56,217

[22] Filed: May 29, 1987

[30] Foreign Application Priority Data

Jun. 10, 1986 [DE] Fed. Rep. of Germany ....... 8615617
Aug. 28, 1986 [DE] Fed. Rep. of Germany ....... 8623042

[51] Int. Cl.$^4$ ............................................. B23K 37/04
[52] U.S. Cl. .................................. 228/49.3; 269/48.1
[58] Field of Search ............ 228/49.3, 42, 219; 279/2 R, 2 A; 269/48.1

[56] References Cited

U.S. PATENT DOCUMENTS 4,405,075 9/1983 Roddy .............................. 228/49.3
4,648,544 3/1987 Puisais et al. ................. 228/49.3 X

FOREIGN PATENT DOCUMENTS 8507555 6/1985 Fed. Rep. of Germany .
8525952 10/1985 Fed. Rep. of Germany .

Primary Examiner—Richard K. Seidel
Assistant Examiner—Carmine Cuda
Attorney, Agent, or Firm—Townsend and Townsend

[57] ABSTRACT

Apparatus for centering and clamping pipe workpieces to be welded to one another, which has, on both sides of a welding zone equipped with an inert-gas supply system, clamping units of which the first comprises at least one clamping device and the second at least two clamping devices. These consist of clamping grooves opening outwards in the form of a wedge and each containing a row of clamping members. Their walls are formed by annular parts movable axially relative to one another. The two outermost of these annular parts are connected releaseably to one another via a pull rod and a drive body, by means of which they can be brought closer to one another counter to a spring-force accumulator and moved away from one another again by means of the spring-force accumulator. The inner annular parts and the welding zone are arranged on a holding body. To make it possible to use the apparatus for different purposes, the inner annular parts and the welding zone can be changed over on the piston rod and on the holding body, in such a way that, in a first assembly state, the welding zone is arranged near the free end of the apparatus, the first clamping unit being located between the free end of the apparatus and the welding zone, or, in a second assembly state, the welding zone is arranged further from the free end of the apparatus, the second clamping unit being located between the free end of the apparatus and the welding zone. If there are four clamping devices altogether, there can also be a third assembly position, in which the two clamping units each comprise two claiming devices.

18 Claims, 1 Drawing Sheet

APPARATUS FOR CENTERING AND CLAMPING PIPE WORKPIECES TO BE WELDED TO ONE ANOTHER

The invention relates to an apparatus for centring and clamping pipe workpieces to be welded to one another, which, on both sides of a welding zone equipped with an inert-gas supply system, has clamping units of which the first comprises at least one and the second at least two clamping devices consisting of clamping grooves which open outwards in the form of a wedge and each contain a row of clamping members and the groove walls of which are formed by annular parts movable axially relative to one another, the outermost of which are connected releaseably to one another via a pull rod and a drive body, by means of which they can be brought closer to one another counter to a spring-force accumulator and can be released again, whilst the innermost and the welding zone are arranged on a holding body so as to be longitudinally displaceable.

By pipe workpieces are meant pipe sections, elbows, flanges and, in the wider sense, all workpieces having a bore, inside which they can be centred and clamped by means of a clamping apparatus.

Clamping apparatuses of the abovementioned type are known (German Utility Model 85.07,555 and German Utility Model 85.25,952). They are designed as an elongate body which is introduced into the pipe workpieces to be welded to one another. At the welding point, it has, as the so-called welding zone, an annular recess into which open inert-gas supply orifices. On one side of the welding zone there is a clamping unit with two clamping devices and on the other side there is a clamping unit with only one clamping device, the rows of clamping members of each clamping device being formed by annular helical springs. To clamp straight pipe sections, a clamping unit with two clamping devices arranged in succession is used, so as to guarantee exact alignment. To clamp elbows or short pipe pieces, such as flanges, the clamping unit with only one clamping device is used. To make it possible to obtain all combinations, at least three types of apparatus are required, namely an apparatus with two clamping units, each consisting of two clamping devices, for welding straight pipe sections, an apparatus in which a clamping unit with only one clamping device is arranged immediately adjacent to the free end of the apparatus, so that elbows can be clamped, and an apparatus in which the clamping unit having only one clamping device is remote from the free end of the apparatus on the far side of the welding zone for the purpose of clamping a flange, a stop being provided for positioning and aligning the flange. Since these are precision instruments, a very high outlay is involved in having to keep at least three different apparatuses in stock for each nominal diameter.

The object on which the invention is based is, therefore, to reduce the outlay for the apparatuses required for the three main uses.

In the solution according to the invention, at least the inner annular parts and the welding zone can be changed over on the piston rod and the holding body respectively, in such a way that, in a first assembly state, the welding zone is arranged near the free end of the apparatus, the first clamping unit being located between the free end of the apparatus and the welding zone, or, in a second assembly state, the welding zone is arranged further from the free end of the apparatus, the second clamping unit being located between the free end of the apparatus and the welding zone.

Because the parts directly forming the clamping units can be changed over, one and the same apparatus in different assembly states can be used for all practical purposes. The outlay in terms of labour for the changeover is comparatively low, because all the drive members can remain unchanged. It is merely necessary to release an end fastening of the apparatus and, after the parts have been changed over, secure it again. The total outlay in terms of provisions and stockkeeping is reduced to approximately a third as a result.

Appropriately, there are four clamping devices altogether, so that, in a third assembly state, the two clamping units can each be equipped with two clamping devices for the clamping of straight pipe sections. In the first and second assembly states, the first clamping unit is then equipped with one clamping device and the second clamping unit with three clamping devices. At the same time, if appropriate, the row of clamping members in a third clamping device of the second clamping unit can be omitted, so that only the remaining two clamping devices are actually effective. It would also be possible to provide only two clamping devices if the apparatus were correspondingly shortened. But it is generally more complicated to allow for shortening the apparatus during construction and conversion than to equip the second clamping unit with a third clamping device otherwise unnecessary.

It may be expedient to arrange not only the annular parts forming the groove walls, but also the welding zone on the holding body so as to be releaseable and capable of being changed over, in which case the latter could, if desired, be connected fixedly to the drive body or the piston rod. However, since this would be a disadvantage when it comes to supplying the inert gas to the welding zone in a simple way, it is generally more expedient, as is known, to arrange the welding zone fixedly on the holding body and design the latter so that it can be changed over as a whole.

In order to supply the inert gas in a simple way to the welding zone which is located at different axial points depending on the assembly state, it is expedient if the holding body encloses an elongate inert-gas supply space which, in every assembly position, is in communication with, on the one hand, the welding zone and, on the other hand, an inert-gas supply orifice in the piston rod.

It is advantageous if the holding body consists of two holding-body parts, the first of which carries the welding zone and forms the gas supply space which is at least approximately half as long as the distance between the outermost annular parts, the gas supply orifice being located approximately in the centre between these outermost annular parts, and if the second holding-body part can be mounted selectively on one side or the other of the first holding-body part. In this way, the welding zone can be arranged both at the two outermost ends (in the first and second assembly states) and in the centre (in the third assembly state). The two holding-body parts can be connectable to one another in a suitable way to form an aligned guide surface, for example by means of suitable fitting surfaces or a screw connection; but in many cases there is no need for such a direct connection if they are both centred relative to the piston rod.

The spring-force accumulator, which returns the annular parts to the releasing position again after the clamping movement caused by the drive, can be formed by one or more springs seated on the piston rod. So that these too can remain unaltered during the change-over, the holding-body end faces and the faces opposite these of the parts connected to the piston-rod end or to the drive body appropriately enclose a spring space which is of the same length in all the assembly states. In certain embodiments, a compression spring is placed in such space. By causing the spring space to be the same length in various assembly states (while the invention is in a noncompressed state), the compression spring will exert a comparable force on the holding body parts regardless of how these parts happen to be arranged on the piston or pull rod. Thus, in FIG. 1 for example, a compression spring located in the space immediately to the right of element 13 and exerting a force on outer sleeve 13 will exert the same force as a similar spring located in the smaller sized space in FIG. 2 or FIG. 3, which exerts force upon the inner supporting cylinder 12. Preferably, however, the spring-force accumulator is formed solely by annular springs provided in the rows of clamping members or forming the rows of clamping members. The springs surrounding the piston rod can then be omitted partially or completely, thus simplifying construction and use.

As is known per se, it is expedient to make the spring force of one clamping unit greater than that of the other, specifically either by means of additional inner springs or as a result of a differing amount of spring force inherent in the clamping devices. This ensures that, in the clamping unit with the lower spring force which opposes the lesser resistance to the clamping-drive movement, the rows of clamping members are pressed outwards against the inner face of the associated workpiece before those of the other clamping unit, so that this workpiece is fixed before the other workpiece. This makes mutual alignment easier. If the spring-force accumulator is formed solely by the clamping devices, annular springs of differing spring constants are preferably used. Instead of this, it would also be possible to give the clamping grooves differing wedge angles. However, clamping grooves which are of essentially the same shape are more expedient.

If there are four clamping devices altogether, appropriately two relatively weak springs and two relatively strong springs are provided, and in the first and second assembly states the first clamping unit is fitted with a relatively strong spring and in the third assembly state each clamping unit is fitted with two identical springs.

To achieve effective cooling of the apparatus and especially of the parts adjacent to the welding zone, it is generally sufficient, according to the invention, if only the piston rod is cooled by means of closed cooling ducts, the cooling effect being transferred from the piston rod to the parts adjacent to the welding zone, on the one hand as a result of heat conduction and heat radiation and on the other hand through convection by means of the inert gas.

Figure 1:
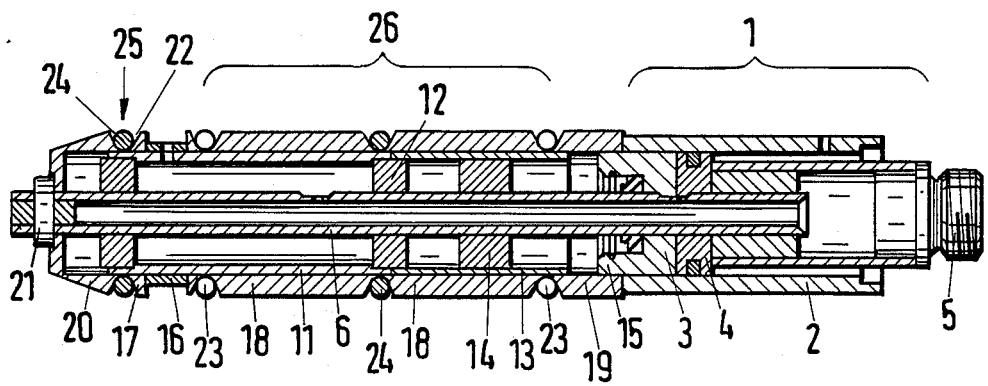
FIG. 1 is a longitudinal section through an embodiment of the apparatus in a first assembly state.

The invention is explained in detail below with reference to the drawing which illustrates an advantageous exemplary embodiment. In it, three figures show a longitudinal section through the same embodiment of the apparatus in different assembly states.

The drive body (1) of the apparatus comprises a cylinder (2) which is closed at its inner end by means of a wall (3). It contains a piston (4) connected fixedly to a connection part (5) and the piston rod (6). The connection part (5) serves for connecting supply hoses, especially for inert gas, the inflow and outflow of cooling water and compressed gas for actuating the piston/cylinder arrangement. The inert gas is conveyed to the inert-gas outflow orifice (8) through a line (7), whilst the cooling water passes through a line (9) to a point near the free closed end of the piston rod, then being returned in the free piston-rod cross-section. The cylinder wall (3) contains a piston-rod gland (10).

Guided concentrically on the piston rod is the first holding-body part consisting of a cylindrical sleeve (11) and end discs (12). Joined to it is the second holding-body part consisting of a sleeve (13) and disc (14). The outside diameters of the sleeves (11 and 13) correspond approximately to the outside diameter of an extension piece (15) of the cylinder wall (3).

Connected firmly to the sleeve (11) is an annular part (16) which forms the welding zone and, corresponding to the sleeve (11), has several through-bores for supplying inert gas. It is flanked by exchangeable annular parts (17) supported firmly on it. There are also sleeve-shaped annular parts (18) and an annular part (19) centred and supported on the projection (15) of the drive body. A dish-shaped annular part (20) is secured releaseably to the free end of the piston rod (6) by means of an easily releaseable fastening (21), for example a threaded nut or a through-key. All the annular parts have an inside diameter which is slightly greater than the outside diameter of the sleeves (11, 13) and of the extension piece (15). They have conical faces turned towards one another to form clamping grooves (22), in which helical springs are arranged as rows of clamping members, specifically relatively weak helical springs (23) and relatively strong helical springs (24).

In order to clamp the apparatus, a pressure medium is introduced into the cylindrical space between the piston (4) and the cylinder wall 93), as a result of which the piston rod is pulled to the right in the drawing and the outermost annular parts (19 and 20) are brought closer to one another, so that the walls of the clamping grooves also approach one another and press the helical springs (23, 24) outwards up against the inner faces of the workpieces to be clamped. Each clamping groove (22), together with the helical spring (23, 24) located in it, thereby forms a clamping device. So far, all the assembly states illustrated correspond to one another.

In the first assembly state shown in FIG. 1, the welding zone (16) is located near the free end of the apparatus. The first clamping unit (25) comprises only one clamping device with a strong spring (24), whereas the second clamping unit (26) comprises three clamping devices, of which the outer two are fitted with weak springs (23) and the inner with a strong spring (24). The first holding body (11, 12) is arranged near the free end of the apparatus, its welding zone likewise being located near the free end of the apparatus. Its inert-gas supply space (27) between the end discs (12) nevertheless reaches the gas supply orifice (8), because the distance between the right-hand end disc (12) and the outermost annular part (20) is somewhat greater than half the distance between the outermost annular parts (19 and 20), and because the gas supply orifice (8) is located in the middle between them. The arrangement of the weak springs in the clamping unit (26) ensures that, when the piston/cylinder arrangement is initially subjected to only slight pressure, the straight pipe section to be clamped on this clamping unit is first fixed with moderate force. It is then still possible to align relative to the pipe section the elbow to be clamped by means of the clamping unit (25) and check the position of the pipe pieces in relation to the welding zone (16) of the apparatus. The piston/cylinder arrangement is then subjected to full pressure and the two workpieces are clamped with the desired force. After welding, the drive is released and the springs (23, 24) contract again when the annular parts (18, 19, 20) move axially away from one another, and the apparatus can be detached from the workpieces again.

Figure 2:
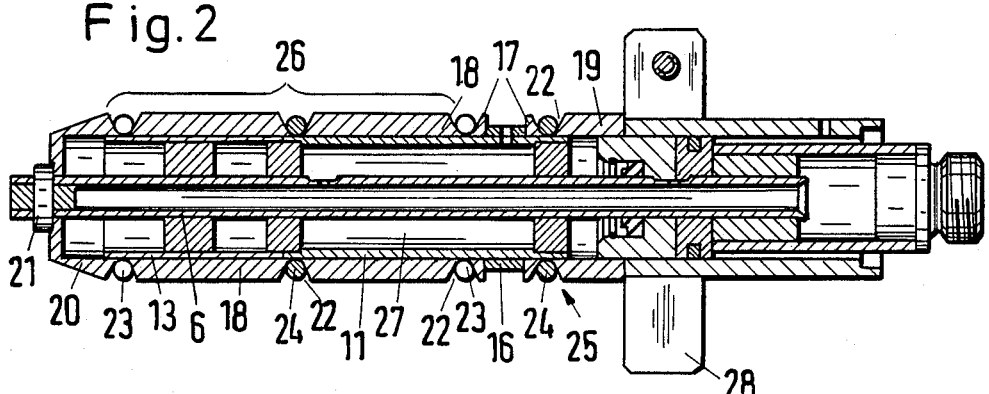
FIG. 2 is a longitudinal section through an embodiment of the apparatus in a second assembly state.

In the second assembly state according to FIG. 2, the arrangement of the holding-body parts (11, 13) and of the annular parts (18) in relation to the welding zone (16) is reversed. A stop flange (28) is attached to the drive body (1) in order to fix and align a flange to be clamped by means of the first clamping unit (25), whilst the clamping unit (26) serves for clamping a straight pipe section. Because a relatively strong spring (24) is arranged in the first clamping unit (25) and relatively weak springs (23) in the second clamping unit (26), the latter is prestressed first when the clamping drive is started, so that before final clamping the relative position can still be checked and the flange still aligned subsequently on the first clamping unit (25). If the flange first and then the pipe section are to be clamped, a weak spring must be provided in the first clamping unit (25), whereas the clamping unit (26) should be fitted solely with strong springs. Although the welding zone (16) is at an extreme distance from the free end of the piston rod (6), it can still be supplied with inert gas from the supply orifice (8), because the distance between the annular part (19) and the gas supply orifice (8) is less than the distance between the annular part (19) and the left-hand end flange (12).

Figure 3:
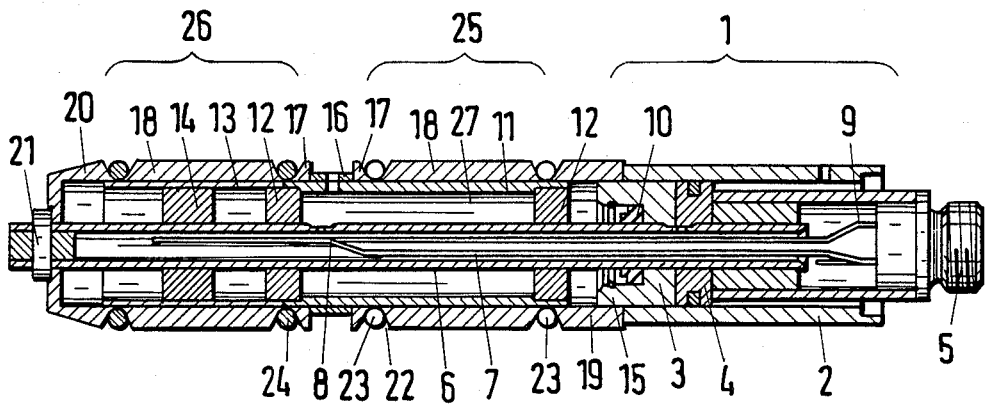
FIG. 3 is a longitudinal section through an embodiment of the apparatus in a third assembly state.

Whereas, in the first and second assembly states, the second holding-body part (13, 14) is arranged on the side of the first holding-body part (11, 12) remote from the welding zone (16), in the third assembly state according to FIG. 3 it is adjacent to the end of the first holding-body part near the welding zone. Consequently, the welding zone (16) is in the middle between the annular parts (19, 20), and it does not matter which of the two holding-body parts is nearer the free end of the apparatus.

In this assembly state, the two clamping units (25, 26) each comprise two clamping devices, of which one is fitted with relatively weak and the other with relatively strong helical springs (23 and 24).

The apparatus can easily be transferred from one assembly state to another by releasing the fastening part (21) and by pulling off the holding bodies, annular parts and springs and re-attaching them in the changed arrangement desired.

I claim:

1. An apparatus for centering and clamping straight, curved or flanged pipe workpieces to be welded to one another, the apparatus configurable in a chosen one of three assembly state for, respectively, welding curved pipe to straight pipe, straight pipe to flanged pipe and straight pipe to straight pipe, the apparatus comprising:
    a pull rod fixedly attached to a drive body;
    a holding-body including first and second bodyparts which are connectable to each other to form an aligned guide surface, axially disposed about said pull rod, defining a welding zone fixedly attached to said first body part, said zone being equipped with an inert gas supply system and further defining at least one clamping unit;
    a first clamping unit, axially mounted about said holding-body on a first side of said welding zone, including a first clamping member having an outwardly opening, wedge-shaped first clamping groove and a first inwardly forcing clamping device, situated in said first groove, adapted to expand radially outwardly in response to movement of said pull rod; and
    a second clamping unit, axially mounted about said holding-body on a second side of said welding zone, including a second clamping member having an outwardly opening wedge-shaped second clamping groove and a second inwardly forcing clamping device, situated in said second groove, adapted to expand radially outwardly in response to movement of said pull rod; and
    a spring-force accumulator for urging said clamping members away from each other;
    the apparatus, in the first assembly state, being arranged such that the first body part is adjacent a free end of the apparatus, and the second body part is adjacent the first body part remote from the welding zone;
    the apparatus, in the second assembly state, being arranged such that the second body part is adjacent a free end of the apparatus, and the first body part is adjacent the second body part with the welding zone remote from the second body part;
    the apparatus, in the third assembly state, being arranged such that the second body part is adjacent a free end of the apparatus, and the first body part is adjacent the second body part with the welding zone adjacent the second body part.

2. An apparatus as defined in claim 1, wherein said first clamping unit is axially mounted about said holding-body on a first side of said welding zone between said welding zone and a free end of the apparatus.

3. An apparatus as defined in claim 1, wherein said second clamping unit is axially mounted about said holding-body on a second side of said welding zone between said welding zone and a free end of the apparatus.

4. An apparatus as defined in claim 1, wherein said first clamping unit includes one clamping device, and said second clamping unit includes three clamping devices.

5. An apparatus as defined in claim 1, wherein said first clamping unit and said second clamping unit each comprise two clamping devices.

6. An apparatus according to claim 1, wherein said holding-body includes a first end face situated opposite a first end face of said drive body and further includes a second end face situated opposite a second end face of said pull rod, said first end faces enclosing therebetween a first spring space having a same length in each assembly state when the apparatus is uncompressed and said second end faces enclosing therebetween a second spring space having a same length in each assembly state when the apparatus is uncompressed.

7. An apparatus according to claim 1, wherein said spring-force accumulator includes an annular spring.

8. An apparatus according to claim 1, wherein said spring-force accumulator includes first and second springs, adjoining springs having differing spring constants.

9. An apparatus according to claim 1, wherein said first clamping device exerts a different amount of inwardly directed force than said second clamping device.

10. An apparatus according to claim 1, wherein said clamping grooves are of substantially the same shape.

11. An apparatus according to claim 1, wherein each said clamping groove defines a different wedge angle.

12. An apparatus according to claim 1, wherein said first and second clamping units each include two clamping devices, and said spring-force accumulator includes first springs having relatively large spring constants and second springs having relatively weak spring constants.

13. An apparatus according to claim 1, wherein said pull-rod includes a closed cooling duct.

14. An apparatus according to claim 1, wherein said holding-body comprises a first body part, supporting said welding zone and defining an elongate inert gas supply space communicating with said welding zone and an inert gas supply orifice in said pull rod situated approximately mid-length of said holding-body, said space having a length exceeding half the total length of said holding-body, and said-holding body further comprising a second body part mounted on a chosen first or second side of said first body part.

15. An apparatus according to claim 14, wherein said holding-body defines an elongate inert gas supply space communicating with said welding zone and with an inert gas supply orifice in said pull rod.

16. An apparatus according to claim 14, wherein said first body-part and said second body-part are connectable to each other, thereby forming an aligned guide surface.

17. An apparatus according to claim 1, wherein said holding-body defines an elongate inert gas supply space communicating with said welding zone and with an inert gas supply orifice in said pull rod.

18. An apparatus according to claim 1, wherein the first body part defines an elongate inert gas supply space communicating with said welding zone and an inert gas supply orifice in said pull rod situated approximately mid-length of said holding-body, said space having a length exceeding half the total length of said holding-body, and the second body part is mounted on a chosen first or second side of said first body part.

* * * * *